United States Patent
List et al.

(10) Patent No.: US 9,778,671 B2
(45) Date of Patent: Oct. 3, 2017

(54) INTEGRATED REGULATOR, IN PARTICULAR VOLTAGE REGULATOR, AND CONTROLLER FOR PASSENGER PROTECTION MEANS, WITH CONFIGURABLE OUTPUT VOLTAGE OF THE CONTROLLER

(71) Applicant: Robert Bosch GmbH, Stuttgart (DE)

(72) Inventors: Carsten List, Walheim (DE); Hartmut Schumacher, Freiberg (DE); Falko Sievers, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 198 days.

(21) Appl. No.: 14/406,084

(22) PCT Filed: May 14, 2013

(86) PCT No.: PCT/EP2013/059884
§ 371 (c)(1),
(2) Date: Dec. 5, 2014

(87) PCT Pub. No.: WO2013/182387
PCT Pub. Date: Dec. 12, 2013

(65) Prior Publication Data
US 2015/0123634 A1    May 7, 2015

(30) Foreign Application Priority Data

Jun. 6, 2012   (DE) .......................... 10 2012 209 583

(51) Int. Cl.
*B60L 1/00*       (2006.01)
*G05F 1/575*    (2006.01)
(Continued)

(52) U.S. Cl.
CPC ............ *G05F 1/575* (2013.01); *B60R 21/017* (2013.01); *H02M 3/158* (2013.01); *H02M 2001/0025* (2013.01)

(58) Field of Classification Search
CPC .................. B60R 21/017; G05F 1/575; H02M 2001/0025; H02M 3/158
(Continued)

(56) References Cited

U.S. PATENT DOCUMENTS 7,821,244 B1 * 10/2010 Signoretti ............. H02M 3/158
                                                                         323/271
2002/0121882 A1   9/2002 Matsuo et al.
(Continued)

FOREIGN PATENT DOCUMENTS

| DE | 10 2009 047480 | 6/2011 |
|---|---|---|
| DE | 10 2010 043100 | 12/2011 |
| JP | 2002-023867 A | 1/2002 |

*Primary Examiner* — Jared Fureman
*Assistant Examiner* — Duc M Pham
(74) *Attorney, Agent, or Firm* — Norton Rose Fulbright US LLP; Gerard Messina

(57) ABSTRACT

An integrated regulator, in particular a voltage regulator, for a personal protection arrangement in a vehicle, includes a regulating element that converts an input signal into an output signal having a defined value, and a control application circuit that applies control to the regulating element to generate the output signal having the defined value. The control application circuit outputs the output signal via the regulating element with at least two different selectable values as a function of a specifying signal, such that for selection of the value of the output signal, a configuration circuit receives at least one configuration signal and, as a function of a configuration ascertained in the context of evaluation, selects one of at least two different specifying signals and applies it to the control application circuit to output the output signal having the selected value.

17 Claims, 2 Drawing Sheets

(51) Int. Cl.
*B60R 21/017* (2006.01)
*H02M 3/158* (2006.01)
*H02M 1/00* (2006.01)

(58) Field of Classification Search
USPC .......................................................... 307/9.1
See application file for complete search history.

(56) References Cited

U.S. PATENT DOCUMENTS

2004/0169498 A1* 9/2004 Goder ..................... H02M 1/36
323/222
2006/0273767 A1* 12/2006 Fujii ..................... H02M 3/156
323/224
2008/0150436 A1* 6/2008 Suzuki ................. H02M 3/156
315/169.3

\* cited by examiner

INTEGRATED REGULATOR, IN PARTICULAR VOLTAGE REGULATOR, AND CONTROLLER FOR PASSENGER PROTECTION MEANS, WITH CONFIGURABLE OUTPUT VOLTAGE OF THE CONTROLLER

FIELD OF THE INVENTION

The present invention proceeds from an integrated regulator, in particular voltage regulator, for a personal protection arrangement in a vehicle, and from a control device for applying control to the personal protection arrangement in a vehicle.

BACKGROUND INFORMATION

Integrated voltage regulators known from the existing art offer the possibility of generating a variety of predefined output voltages. For many voltage regulators there are therefore different variant embodiments that differ only in terms of the output voltage to be regulated, although a separate regulator is to be used for each voltage value. There are also voltage regulators whose output voltage can be adjusted variably by adapting an external voltage divider. Regulation occurs here to a predefined "feedback" voltage of, for example, 1.2 V that is divided down from an output voltage of the regulator by an external voltage divider having at least two resistors. By varying this voltage divider it is possible to adjust the output voltage of the regulator, which is always higher than the feedback voltage. The existing variable circuits are for the most part highly fault-susceptible. An individual fault at one of the external voltage divider resistors can result directly in an incorrect and possibly damaging output voltage. Fault detection is usually possible only with difficulty, since the regulator itself cannot distinguish between a resistance value that is incorrectly too high or too low, and a resistance value deliberately selected to be too high or low.

German published application DE 10 2009 047 480 A1 discusses, for example, a control device and a method for applying control to a personal protection arrangement for a vehicle. The control device described encompasses a supply module that converts an input voltage for application of control to the personal protection arrangement. Connected between a vehicle supply voltage and the input voltage of the supply module is a voltage regulator that limits the input voltage to a defined first value.

SUMMARY OF THE INVENTION

The integrated regulator according to the present invention for personal protection arrangement in a vehicle, having the features described herein, and a corresponding control device for applying control to personal protection arrangement having such an integrated regulator, having the features described herein, have the advantage, in contrast, that the output voltage of an integrated regulator can easily be selected via a corresponding configuration signal. Especially in the case of utilization as an integrated voltage regulator, it is thus possible to react flexibly to changes in supply voltage requirements, and to supply at least two different voltages selectably to system modules. Compatibility thus exists with various microcontrollers, which depending on the model and version are powered with 3.3 V or 1.2 V, and it is advantageously possible to switch without difficulty between the different microcontrollers. In addition, embodiments of the integrated regulator according to the present invention are robust with respect to single faults, offer comprehensive diagnosis capabilities, and can thus be used even for safety-critical systems that must meet safety requirements in accordance with ISO 26262.

An aspect of the present invention is to modify the output signal of an integrated regulator without using different regulator variants and without adapting external voltage dividers and without using an additional second regulator. The output signal can thus be modified in cost-neutral fashion, for example (in exemplifying embodiments of the integrated regulator according to the present invention) by simply performing a modification of a pin configuration. For example, at least one pin left open or at least one pin connected to ground can represent different configurations of the integrated regulator. In contrast to software programming, in which the switchover to the correct output signal does not occur until much of the system (including a microcontroller) is already in operation, a configuration of this kind is then already available at the beginning of system initialization, so that the output signal is set directly to the correct value. Optimum integration into the signal monitoring and safety concept is thus advantageously possible.

In addition, thanks to complete integration of the regulator module with no modifiable external voltage dividers, etc., accuracy can be appreciably improved as compared with solutions known from the existing art having external voltage divider resistors. By way of a suitable selection of the configuration possibilities, for example multiple configuration pins and/or a limited number of permitted states and/or a time limitation for pin polling, embodiments of the integrated regulator according to the present invention can be robust with regard to single faults occurring at the configuration pins, i.e. individual faulty short circuits at the configuration pins cannot result in an incorrect output signal. Incorrect configurations that are caused by multiple faults can advantageously be detected by simply reading out, by way of a software query, a status register that indicates the detected configuration.

Embodiments of the present invention make available an integrated regulator, in particular a voltage regulator, for personal protection arrangement in a vehicle, which encompasses a regulating element that converts an input signal into an output signal having a defined value, and a control application circuit that applies control to the regulating element as a function of a feedback signal in order to generate the output signal having the defined value. According to the present invention, the control application circuit outputs the output signal via the regulating element with at least two different selectable values as a function of a specifying signal, such that for selection of the value of the output signal, a configuration circuit receives at least one configuration signal and, as a function of a configuration ascertained in the context of evaluation, selects one of at least two different specifying signals and applies it to the control application circuit in order to output the output signal having the selected value.

Also proposed is a control device for applying control to personal protection arrangement in a vehicle, having a regulator assemblage that regulates at least one voltage in the control device. According to the present invention the regulator assemblage has at least one integrated regulator according to the present invention.

The features and refinements set forth in the dependent claims make possible advantageous improvements to the integrated regulator, indicated in the independent claim 1, for personal protection arrangement in a vehicle.

It is particularly advantageous that the at least two selectable specifying signals are predefined reference signals or are feedback signals generatable from the output signal. Because a feedback signal generated from the output signal is compared with a defined reference signal in order to regulate or convert the input signal into the output signal, a variety of control application signals for the regulating element, for the output of output signals having a variety of selectable values, can be generated by specifying different predefined reference signals or by specifying different feedback signals.

In an advantageous embodiment of the integrated regulator according to the present invention, in order to generate the output signal having a first value, the configuration circuit can select a first reference signal via a selection circuit and apply it to the control application circuit which, in order to generate a first control application signal for the regulating element, can compare the first reference signal with a feedback signal generated from the output signal; and in order to generate the output signal having a second value, the configuration circuit can select a second reference signal via the selection circuit and apply it to the control application circuit which, in order to generate a second control application signal for the regulating element, can compare the second reference signal with the feedback signal generated from the output signal. In a simple embodiment of the invention, the selection circuit can be embodied with only two specifying signals, for example as a simple semiconductor switch that, as a function of a control application signal, selects either the first reference signal or the second reference signal and applies it as a selected specifying signal to the control application circuit.

In a further advantageous embodiment of the integrated regulator according to the present invention, in order to generate the output signal having a first value, the configuration circuit can select a first feedback signal via a selection circuit and apply it to the control application circuit which, in order to generate a first control application signal for the regulating element, can compare the first feedback signal with a predefined reference signal; and in order to generate the output signal having a second value, the configuration circuit can select a second feedback signal via the selection circuit and apply it to the control application circuit which, in order to generate a second control application signal for the regulating element, can compare the second feedback signal with the predefined reference signal.

In a further advantageous embodiment of the integrated regulator according to the present invention, at least two integrated voltage dividers having different division ratios can generate the at least two selectable feedback signals from the output signal. This means that two voltage dividers having different defined resistance combinations, which produce different output voltages, are used. In a simple embodiment of the invention, the selection circuit can be embodied with only two specifying signals, for example as a simple semiconductor switch that, as a function of a control application signal, selects either an output signal of a first voltage divider or an output signal of a second voltage divider and applies it as a selected specifying signal to the control application circuit.

In a further advantageous embodiment of the integrated regulator according to the present invention, the configuration circuit can carry out the identification of the current configuration, and the selection of the specifying signal, during a system initialization. The correct output signal is thereby already available substantially sooner than in the case of software programming.

In a further advantageous embodiment of the integrated regulator according to the present invention, the at least one configuration signal can be generated using a pin configuration, such that in order to generate a first logical signal level for the at least one configuration signal, a corresponding connector pin is fixedly connected to ground; and in order to generate a second logical signal level for the at least one configuration signal, a corresponding connector pin is left open. In addition, a pull-up circuit disposed inside or outside the integrated regulator can bring to the second logical signal level a connector pin that has been left open. A pull-up circuit of this kind may encompass an ohmic resistance that is connected to a defined voltage potential that may represent the second logical signal level. Generating the at least one configuration signal via the pin configuration advantageously makes possible a simple and economical implementation of the integrated regulator according to the present invention.

In a further advantageous embodiment of the integrated regulator according to the present invention, the configuration circuit can receive and evaluate at least two configuration signals, the configuration circuit evaluating a logical combination of the at least two configuration signals in order to select the specifying signal. The configuration circuit can furthermore, for a detected logical combination of the at least two configuration signals which is valid, select a specifying signal associated with the detected logical combination, and for a detected logical combination of the at least two configuration signals which is invalid, can prevent output of the output signal. In order to improve fault diagnosis, the configuration circuit can lock the detected logical combination of the at least two configuration signals and store it in a status memory. Locking of the detected logical combination can advantageously prevent faults that occur from being able to cause a modification of the configuration during operation.

Exemplifying embodiments of the invention are depicted in the drawings and will be explained in more detail in the description that follows. In the drawings, identical reference characters identify respective components or elements that perform identical or analogous functions.

DETAILED DESCRIPTION

Present-day control devices for personal protection arrangement in motor vehicles are notable, inter alia, for the fact that all the supply voltages that are necessary for operation of the personal protection arrangement are generated within the personal protection system itself. It is thereby possible to ensure correct functioning regardless of fluctuations in the battery voltage in the vehicle. The voltage regulators used can be embodied either as linear regulators or as DC/DC switching converters, and make available predefined output voltages to be supplied directly to other personal protection system modules, for example microcontrollers, sensors, communication interfaces, lamp drivers, etc. In present-day personal protection systems, for example, output voltages of 6.7 V, 5.0 V, and 3.3 V are made available.

Figure 1:
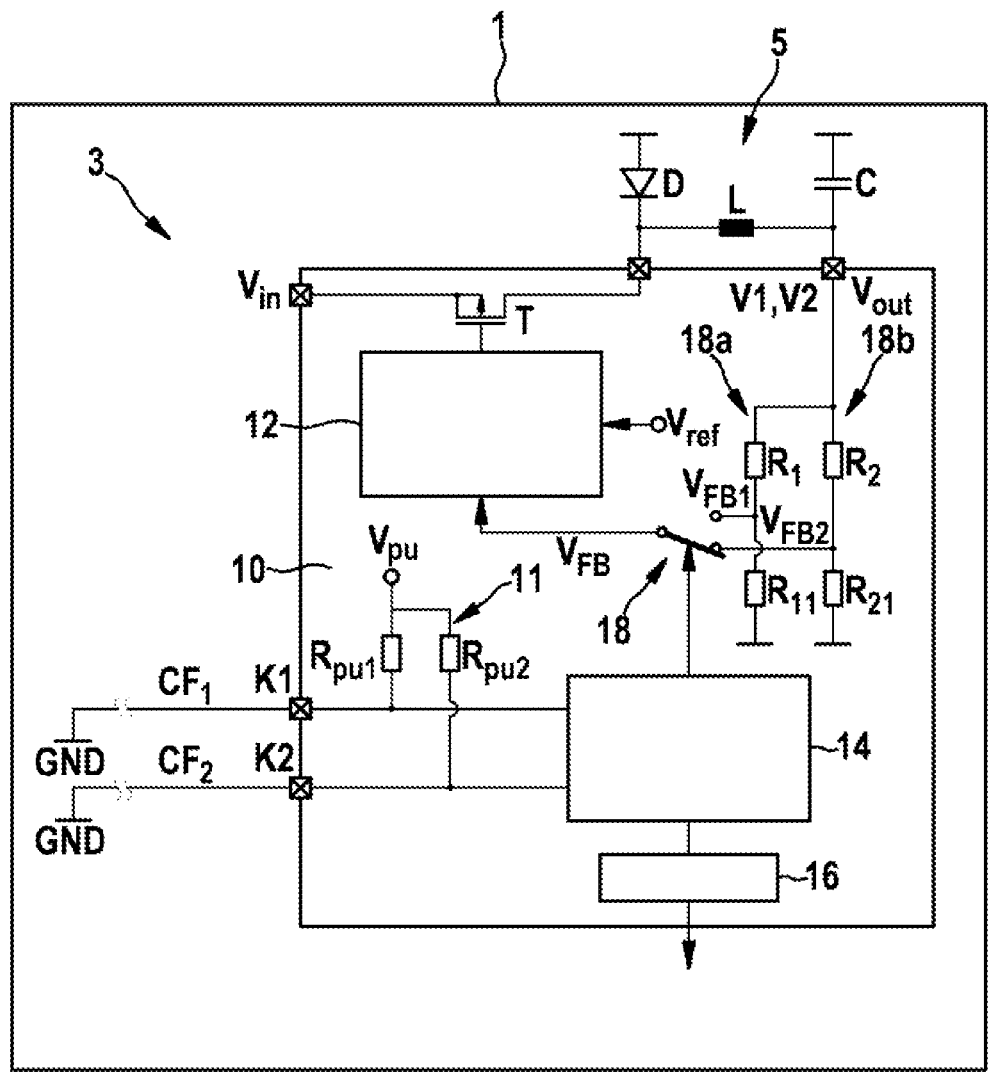
FIG. 1 is a schematic block diagram of a portion of a control device for personal protection arrangement having a first exemplifying embodiment of an integrated regulator according to the present invention.
Figure 2:
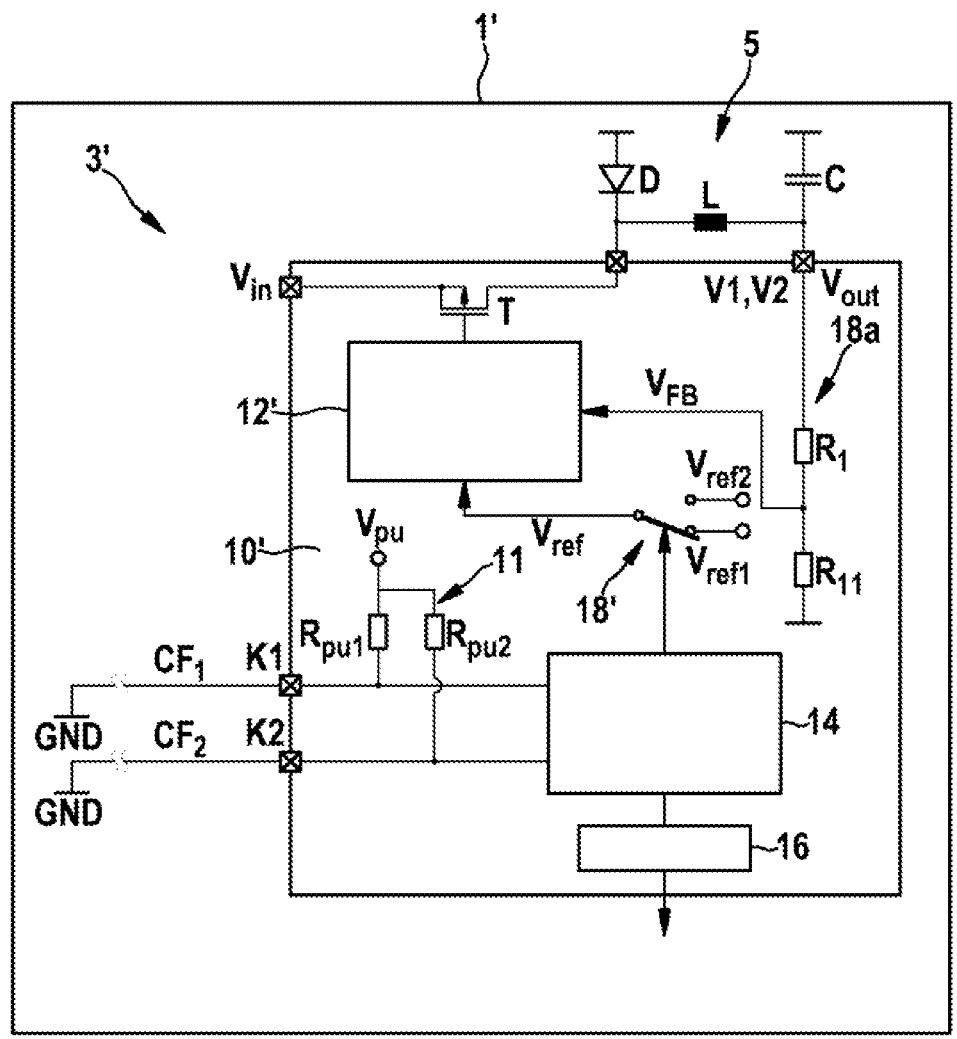
FIG. 2 is a schematic block diagram of a portion of a control device for personal protection arrangement having a second exemplifying embodiment of an integrated regulator according to the present invention.

As is evident from FIG. 1 and FIG. 2, the examples depicted of an integrated regulator 10, 10' according to the present invention, which is embodied in the exemplifying embodiments depicted as a voltage regulator for personal protection arrangement in a vehicle, encompass a regulating element T that converts an input signal $V_{in}$ into an output signal $V_{out}$ having a defined value, and a control application circuit 12, 12' that applies control to regulating element T in order to generate the output signal $V_{out}$ having the defined value.

According to the present invention, control application circuit 12, 12' outputs output signal $V_{out}$ via regulating element T with at least two different selectable values V1, V2 as a function of a specifying signal $V_{FB1}$, $V_{FB2}$, $V_{ref1}$, $V_{ref2}$; in order to select the value V1, V2 of output signal $V_{out}$, a configuration circuit 14 receives and evaluates at least one configuration signal $CF_1$, $CF_2$, and as a function of a configuration ascertained in the context of the evaluation selects one of at least two different specifying signals $V_{FB1}$, $V_{FB2}$, $V_{ref1}$, $V_{ref2}$ and applies it to control application circuit 12, 12' in order to output the output signal $V_{out}$ having the selected value V1, V2.

As is further evident from FIG. 1 and FIG. 2, the at least two selectable specifying signals $V_{FB1}$, $V_{FB2}$, $V_{ref1}$, $V_{ref2}$ can be predefined reference signals $V_{ref1}$, $V_{ref2}$ or feedback signals $V_{FB1}$, $V_{FB2}$ generatable from the output signal $V_{out}$. In order to regulate or convert the input signal $V_{in}$ into the output signal $V_{out}$, control application circuit 12, 12' respectively compares a feedback signal $V_{FB}$ generated from the output signal $V_{out}$ with a defined reference signal $V_{ref}$. Different control application signals for regulating element T, for the output of output signals $V_{out}$ having different selectable values V1, V2, can therefore be generated by specifying different predefined reference signals $V_{ref1}$, $V_{ref2}$ or by specifying different feedback signals $V_{FB1}$, $V_{FB2}$.

As is further evident from FIG. 1, at least two feedback signals $V_{FB1}$, $V_{FB2}$, outputtable to control application circuit 12, for generating at least two output signals $V_{out}$ having different values V1, V2, can be provided, in which context configuration circuit 14 receives and evaluates at least one configuration signal $CF_1$, $CF_2$, and as a function of the evaluation selects one of the at least two feedback signals $V_{FB1}$, $V_{FB2}$ for output to control application circuit 12. In the exemplifying embodiment depicted, two voltage dividers 18a, 18b integrated into regulator 10 generate the at least two selectable feedback signals $V_{FB1}$, $V_{FB2}$ from the output signal $V_{out}$. The two integrated voltage dividers 18a, 18b each encompass two resistors R1, R11, R2, R21 whose resistance values are selected so that the two integrated voltage dividers 18a, 18b exhibit different respective division ratios R1/R11 and R2/R21 for generating the feedback signals $V_{FB1}$, $V_{FB2}$.

As is further evident from FIG. 1, in order to generate the output signal $V_{out}$ having a first value V1, configuration circuit 14 selects a first feedback signal $V_{FB1}$ via selection circuit 18, which applies the selected first feedback signal $V_{FB1}$ to control application circuit 12. In order to generate a first control application signal for regulating element T, control application circuit 12 compares the first feedback signal $V_{FB1}$ with a predefined reference signal $V_{ref}$. In order to generate the output signal $V_{out}$ having a second value V2, configuration circuit 14 selects a second feedback signal $V_{FB2}$ via selection circuit 18, which applies the selected second feedback signal $V_{FB2}$ to control application circuit 12. In order to generate a second control application signal for regulating element T, control application circuit 12 compares the second feedback signal $V_{FB2}$ with the predefined reference signal $V_{ref}$.

As is further evident from FIG. 2, at least two reference signals $V_{ref1}$, $V_{ref2}$ outputtable to control application circuit 12' are provided for generating at least two output signals $V_{out}$ having different values V1, V2, in which context configuration circuit 14 receives and evaluates at least one configuration signal $CF_1$, $CF_2$, and as a function of the evaluation selects one of the at least two reference signals $V_{ref1}$, $V_{ref2}$ for output to control application circuit 12'.

As is further evident from FIG. 2, in order to generate the output signal $V_{out}$ having a first value V1, configuration circuit 14 selects a first reference signal $V_{ref1}$ via a selection circuit 18', which applies the selected first reference signal $V_{ref1}$ to control application circuit 12'. In order to generate a first control application signal for regulating element T, control application circuit 12' compares the first reference signal $V_{ref1}$ with a feedback signal $V_{FB}$ generated from output signal $V_{out}$. In order to generate the output signal $V_{out}$ having the second value V2, configuration circuit 14 selects a second reference signal $V_{ref2}$ via selection circuit 18', which applies the selected second reference signal $V_{ref2}$ to control application circuit 12'. In order to generate a second control application signal for regulating element T, control application circuit 12' compares the second reference signal $V_{ref2}$ with the feedback signal $V_{FB}$ generated from the output signal $V_{out}$. In the second exemplifying embodiment that is depicted, a voltage divider 18a integrated into regulator 10' generates, from the output signal $V_{out}$, the feedback signal $V_{FB}$ that is compared with the selected reference signal $V_{ref1}$, $V_{ref2}$. The integrated voltage divider 18a encompasses two resistors R1, R11 that exhibit a defined division ratio R1/R11.

As is further evident from FIG. 1 and FIG. 2, in the exemplifying embodiments depicted the integrated regulator 10, 10' is embodied respectively as an application-specific integrated circuit (ASIC) module, and is part of a regulator assemblage 3, 3' in a control device 1, 1' for personal protection arrangement. In the exemplifying embodiments depicted, the integrated regulator 10, 10' respectively encompasses two configuration pins K1, K2, one input pin at which the input signal $V_{in}$ is applied, and two output pins for outputting the output signal $V_{out}$; provided between the output pins is an external wiring layout 5 that encompasses a polarity protector diode D as well as an inductance L and a capacitance C for signal filtering. Alternatively, however, regulator 10, 10' can also be integrated into a system ASIC module of a control device 1, 1' of the personal protection system.

Regulator 10, 10' implemented as a voltage regulator offers, for example, the possibility of making the output voltage $V_{out}$ available at the regulator output selectably with a first value V1=1.2 V or with a second value V2=3.3 V. This voltage is selected via the two configuration pins K1, K2. The status of these two configuration pins K1, K2 is either a logical Low level (L) that is implemented by an external short circuit of the corresponding configuration pin K1, K2 to ground GND, or a logical High level (H) that is implemented by an open configuration pin K1, K2. In the exemplifying embodiments depicted, a pull-up circuit 11 disposed respectively inside the integrated regulator 10, 10' brings to the logical High level (H) a configuration pin K1, K2 that has been left open. Pull-up circuit 11 encompasses, for each of configuration pins K1, K2, a pull-up resistor $R_{pu1}$, $R_{pu2}$ that is respectively connected at one terminal to the corresponding configuration pin K1, K2 and at the other terminal to a pull-up voltage $V_{pu}$ whose level corresponds approximately to the logical High level (H). The levels of configuration pins K1, K2, as configuration signals $CF_2$, $CF_2$, are read back and evaluated by configuration circuit 14. Detection of the current configuration is accomplished, for example, using at least one respective voltage comparator. When two configuration pins K1, K2 having two configuration signals $CF_2$, $CF_2$ are used, four configuration combinations are possible; these are depicted in Table 1:

TABLE 1

| $CF_1$ | $CF_2$ | Configuration |
|---|---|---|
| L | L | invalid |
| L | H | first output voltage |
| H | L | second output voltage |
| H | H | invalid |

In the exemplifying embodiment depicted, of the four configuration combinations at the two configuration pins K1, K2 only two combinations, for which the two configuration signals $CF_1$, $CF_2$ have different logical levels (H) (L), are valid. This ensures that a faulty valid state cannot be achieved as a result of an external short circuit at one of configuration pins K1, K2. The system is thus robust with respect to single faults at configuration pins K1, K2. If a valid configuration combination is detected, configuration circuit 14 then selects, via a selection circuit 18, 18', the corresponding specifying signal $V_{FB1}$, $V_{FB2}$, $V_{ref1}$, $V_{ref2}$, which is then applied to control application circuit 12, 12' in order to generate the control application signal for regulating element T.

If an invalid state, in which the two configuration signals $CF_1$, $CF_2$ have the same logical level, is detected, the configurable regulator 10, 10' according to the present invention, or its voltage supply, can then be deactivated. Alternatively, it is also possible to use a different safety mechanism which ensures that a faulty output voltage is not outputted from regulator 10, 10'. The result in any event is that the connected component, for example a microcontroller, is prevented from being supplied with an incorrect voltage. In addition, the overall system is held in a reset state, i.e. in a "not active" or safe state.

Evaluation of the configuration signals $CF_1$, $CF_2$ at configuration pins K1, K2 occurs at the beginning of the initialization phase of the system, as soon as the internal logic circuits of the integrated regulator 10, 10' according to the present invention are sufficiently powered. This ensures that the regulator configuration is immediately detected correctly, and the output voltage $V_{out}$ associated therewith, of the integrated 10, 10' according to the present invention is immediately set correctly to the desired value V1 or V2 before the system components powered thereby are enabled by the system-wide reset. Fault-free voltage supply to the system is thus ensured. After initial read-in of the configuration signals $CF_1$, $CF_2$ at configuration pins K1, K2, the detected configuration is locked so that any further change in pin status has no further influence on regulator 10, 10'. Faulty voltage changes, for example related to EMC, therefore cannot occur during normal operation of control device 1, 1'. In addition, the detected configuration of the configuration pins is stored in a memory arrangement 16 which may be embodied as a register. Memory arrangement 16 can then be read out during operation, for example by a software query. As a result, a configuration that has possibly been incorrectly detected due to multiple faults can be detected, and a fault display can occur.

In alternative embodiments (not depicted) of the integrated regulator 10, 10' according to the present invention, it is also possible for more than just two output voltages to be set, provided the number of configuration pins and the number of logical states is increased, and a correspondingly greater number of specifying signals $V_{FB1}$, $V_{FB2}$, $V_{ref1}$, $V_{ref2}$ is reserved. With three configuration pins, for example, which can each assume two logical states (H/L), it is already possible to define four valid configuration combinations (L-L-H, L-H-L, H-L-L, and H-H-H) for selection, with no reduction in robustness with regard to single faults. The same is true if, in addition to the logical High level and logical Low level, intermediate levels can also be detected using additional voltage comparators.

The detection thresholds at the configuration pins, and the manner in which voltage is delivered, can also be embodied differently from the exemplifying embodiments depicted. The exemplifying embodiments of the regulator 10, 10' according to the present invention which are depicted each use an integrated pull-up circuit 11 having an internal pull-up voltage $V_{pu}$. Alternatively, it is also possible to use an external pull-up circuit, i.e. a pull-up circuit disposed outside the integrated regulator 10, 10', and a corresponding external pull-up voltage, to generate the High level (H) at an open configuration pin. Different voltage levels for detecting different logical states are likewise possible, for example connecting to ground GND or to different voltage potentials, for example 5.0 V, 3.3 V, etc. Embodiments of the integrated regulator according to the present invention can be embodied, for example, as linear regulators or as DC/DC switching converters.

What is claimed is:

1. An integrated regulator for a personal protection arrangement in a vehicle, comprising:
   a regulating element to convert an input signal into an output signal having a defined value; and
   a control application circuit to control the regulating element to generate the output signal having the defined value;
   wherein the control application circuit outputs the output signal via the regulating element with at least two different selectable values as a function of a specifying signal, such that for selection of the value of the output signal, a configuration circuit receives at least one configuration signal and, as a function of a configuration ascertained in the context of evaluation, selects one of at least two different specifying signals and applies it to the control application circuit to output the output signal having the selected value, and
   wherein the at least one configuration signal is generatable using a pin configuration, wherein to generate a first logical signal level for the at least one configuration signal, a corresponding connector pin is fixedly connected to ground, and wherein to generate a second logical signal level for the at least one configuration signal, a corresponding connector pin is left open.

2. The integrated regulator of claim 1, wherein the at least two selectable specifying signals are predefined reference signals or are feedback signals generatable from the output signal.

3. The integrated regulator of claim 2, wherein to generate the output signal having a first value, the configuration circuit selects a first reference signal via a selection circuit and applies it to the control application circuit which, in order to generate a first control application signal for the regulating element, compares the first reference signal with a feedback signal generated from the output signal, and wherein to generate the output signal having a second value, the configuration circuit selects a second reference signal via the selection circuit and applies it to the control application circuit which, in order to generate a second control application signal for the regulating element, compares the second reference signal with the feedback signal generated from the output signal.

4. The integrated regulator of claim 2, wherein to generate the output signal having the first value, the configuration circuit selects a first feedback signal via a selection circuit and applies it to the control application circuit which, in order to generate a first control application signal for the regulating element, compares the first feedback signal with a predefined reference signal, and wherein to generate the output signal having the second value, the configuration circuit selects a second feedback signal via the selection circuit and applies it to the control application circuit which, in order to generate a second control application signal for the regulating element, compares the second feedback signal with the predefined reference signal.

5. The integrated regulator of claim 4, wherein there are at least two integrated voltage dividers having different division ratios which generate the at least two selectable feedback signals from the output signal.

6. The integrated regulator of claim 1, wherein the configuration circuit carries out the identification of the current configuration, and the selection of the specifying signal, during a system initialization.

7. The integrated regulator of claim 1, wherein a pull-up circuit located inside or outside the integrated regulator brings to the second logical signal level a connector pin that has been left open.

8. The integrated regulator of claim 1, wherein the configuration circuit receives and evaluates at least two configuration signals, the configuration circuit evaluating a logical combination of the at least two configuration signals to select the specifying signal.

9. The integrated regulator of claim 8, further comprising:
a first configuration signal of the at least two configuration signals is received at a first connector pin, and
a second configuration signal of the at least two configuration signals is received at a second connector pin.

10. The integrated regulator of claim 9, wherein the control application circuit is configured to detect an external fault based on the first and second configuration signals received at the first and second connector pins.

11. The integrated regulator of claim 8, wherein the configuration circuit, for a detected logical combination of the at least two configuration signals which is valid, selects a specifying signal associated with the detected logical combination, and for a detected logical combination of the at least two configuration signals which is invalid, prevents output of the output signal.

12. The integrated regulator of claim 11, wherein the detected logical combination of the at least two configuration signals is invalid when the two configuration signals correspond to identical logical states of high or low.

13. The integrated regulator of claim 11, wherein the detected logical combination of the at least two configuration signals is valid when the at least two configuration signals do not correspond to identical logical states of high or low.

14. The integrated regulator of claim 11, wherein the regulator is deactivated upon detection of a logical combination of the at least two configuration signals which is invalid.

15. The integrated regulator of claim 8, wherein the configuration circuit locks the detected logical combination of the at least two configuration signals and stores it in a status memory.

16. The integrated regulator of claim 1, wherein the integrated regulator includes a voltage regulator.

17. A control device for applying control to personal protection arrangement in a vehicle, comprising:
a regulator assemblage to regulate at least one voltage in the control device;
wherein the regulator assemblage includes at least one integrated regulator for a personal protection arrangement in a vehicle, including:
a regulating element to convert an input signal into an output signal having a defined value; and
a control application circuit to control the regulating element to generate the output signal having the defined value;
wherein the control application circuit outputs the output signal via the regulating element with at least two different selectable values as a function of a specifying signal, such that for selection of the value of the output signal, a configuration circuit receives at least one configuration signal and, as a function of a configuration ascertained in the context of evaluation, selects one of at least two different specifying signals and applies it to the control application circuit to output the output signal having the selected value, and
wherein the at least one configuration signal is generatable using a pin configuration, wherein to generate a first logical signal level for the at least one configuration signal, a corresponding connector pin is fixedly connected to ground, and wherein to generate a second logical signal level for the at least one configuration signal, a corresponding connector pin is left open.

* * * * *